United States Patent Office 2,965,475
Patented Dec. 20, 1960

2,965,475
PROCESS FOR THE PRODUCTION OF METALS

Benjamin J. Wilson, Kenmore, N.Y., assignor to Union Carbide Corporation, a corporation of New York No Drawing. Filed Jan. 13, 1960, Ser. No. 2,136
5 Claims. (Cl. 75—67)

The present invention relates to an improved process for the production of metals such as calcium, barium, strontium, and lithium from their respective carbides and, more particularly, to an improved process for the production of these metals by thermal decomposition of their respective carbides.

Although the process of this invention will be hereinafter described with particular reference to the production of calcium metal, this process is applicable to the production of barium, strontium, and lithium.

A method long known for preparing calcium comprises heating calcium carbide to a temperature at which decomposition to carbon and calcium is effected. The carbon remains behind as a residue while the gaseous calcium is condensed and collected in a cooler part of the furnace or in a separate cooled chamber. However, a problem inherent in this method for producing calcium metal is that the metal produced is contaminated by impurities such as calcium oxide, carbon, and calcium carbide. These undesirable contaminants are extremely difficult, if not impossible, to separate from the calcium produced, and their presence in the calcium produced is primarily due to the presence of calcium oxide in the calcium carbide starting material.

It is an object of this invention to provide a process for the production of metals such as calcium, barium, strontium, and lithium substantially free from impurities by decomposition of their impure carbides.

Other aims and advantages of the present invention will be apparent from the following description and appended claims.

In accordance with the invention, the process for producing at least one metal selected from the group consisting of calcium, barium, strontium, and lithium comprises thermally decomposing an impure carbide of the selected group metal to produce a gaseous mixture of elemental metal and carbon monoxide; passing the gaseous mixture to a purifying zone maintained at a temperature above the condensation temperature of the metal, the purifying zone containing at least one active refractory metal selected from the group consisting of titanium and zirconium, wherein the carbon monoxide reacts with the refractory metal, which acts as an acceptor, to form at least one solid compound at the temperature of the purifying zone; and passing the unreacted gaseous elemental metal to a cooling zone maintained at a temperature below the condensation temperature of the metal to recover the elemental metal.

It has been found that in accordance with this invention pure calcium can be produced from commercially available calcium carbide sources or from any calcium carbide material which contains calcium oxide as an impurity therein.

Although it is not essential to the operability of the process of the invention, the calcium oxide-contaminated calcium carbide may be reduced in particle size prior to the metal being charged to the heating zone for thermal decomposition thereof. Since the rate of decomposition is a function of surface area, a larger surface area is desirable. Therefore, prior to charging the calcium oxide-contaminated calcium carbide to the heating zone, it is preferred to reduce the metal in particle size to between about ¼ to ½ inch mesh size. Any suitable method for reducing particle sizes may be employed.

The calcium oxide-contaminated calcium carbide is charged to any suitable apparatus that may be adapted to incorporate the essential features for practicing this invention and is preferably charged to the apparatus disclosed and claimed in my copending application Serial No. 740,646, filed June 9, 1958.

The gaseous mixture produced by decomposition of the calcium oxide-contaminated calcium carbide charge is passed to a purifying zone wherein the carbon monoxide is removed. This removal from the gaseous mixture may be effected by maintaining the purifying zone at a temperature above the condensation temperature of calcium, that is, a temperature above about 850° C., with the optimum temperature of the purifying zone being close to the condensation temperature of calcium in the order of about 1000° C. This zone may be maintained at the desired temperature either by radiant heating from the charge or by separate heating means.

In this zone the carbon monoxide produced by the thermal decomposition of the calcium oxide-contaminated calcium carbide reacts with the titanium or zirconium metal contained therein to produce, for example, titanium oxide and titanium carbide. The amount of titanium or zirconium charged to the purifying zone is an amount sufficient to react with all the CO passing therethrough. It is preferred, however, in order to ensure complete removal of the carbon monoxide, that a slight excess of the metal be employed in the purifying zone. In addition, any volatile compounds of chromium, aluminum, iron, and silicon that have a condensation temperature above that of calcium may also be removed in the purifying zone.

The unreacted gaseous elemental calcium passes to a cooling zone that is maintained at a temperature below the condensation temperature of calcium. Here the gaseous calcium condenses and is collected in this zone. This cooling zone may be water cooled or may be cooled by any other suitable means.

In practicing the present invention, the apparatus employed is first evacuated to the greatest extent permissible to ensure removal of air and other gases which may possibly react with the distilled calcium. The ambient pressure of the system is maintained at a value less than the vapor pressure of the calcium and is preferably subatmospheric. For example, thermal decomposition of approximately 1500 grams of calcium carbide containing 20 percent calcium oxide was carried out at about 1600° C. and between a pressure of 0.1 to 10 microns.

The following example will better serve to illustrate the process of this invention.

*Example*

One hundred and ninety-three grams of calcium carbide containing approximately 20 percent calcium oxide comprised the charge to be thermally decomposed. The charge, prior to introduction into the heating zone, was ground to a particle size of between ¼ to ½ inch mesh size. The portion of the furnace in which the charge resided was heated by high frequency coils to a temperature of about 1600° C. and at a pressure of from 0.1 to 10 microns. The purifying zone immediately adjacent to the heating zone was heated by radiation to about 1000° C. and contained therein approximately four grams of titanium. The cooling zone immediately adjacent to the purifying zone was water cooled to a temperature below the condensation temperature of calcium.

The charge was heated for a period of three hours. At the end of this time the calcium carbide charge was completely decomposed and only graphite remained. A solid residue formed in the purifying zone and was apparently titanium dioxide. The cooling zone contained 115 grams of calcium which represented a yield of 92 percent.

It has been found that calcium produced in accordance with the process of the present invention is at least about 99 percent pure.

What is claimed is:

1. A process for the production of a metal selected from the group consisting of calcium, barium, strontium, and lithium which comprises thermally decomposing an impure carbide of said selected metal to produce a gaseous mixture of elemental metal and carbon monoxide; passing said gaseous mixture to a purifying zone maintained at a temperature above the condensation temperature of said elemental metal, said purifying zone containing at least one active refractory metal selected from the group consisting of titanium and zirconium; reacting said carbon monoxide with said active refractory metal in said purifying zone to form at least one solid compound at the temperature of said purifying zone; and passing said gaseous elemental metal to a cooling zone maintained at a temperature below the condensation temperature of said metal to recover said elemental metal.

2. A process for the production of a metal selected from the group consisting of calcium, barium, strontium, and lithium which comprises thermally decomposing, under subatmospheric pressure conditions, an impure carbide of said selected metal to produce a gaseous mixture of elemental metal and carbon monoxide; passing said gaseous mixture to a purifying zone maintained at a temperature above the condensation temperature of said elemental metal, said purifying zone containing at least one active refractory metal selected from the group consisting of titanium and zirconium; reacting said carbon monoxide with said active refractory metal in said purifying zone to form at least one solid compound at the temperature of said purifying zone; and passing said gaseous elemental metal to a cooling zone maintained at a temperature below the condensation temperature of said metal to recover said elemental metal.

3. A process for the production of calcium metal which comprises thermally decomposing calcium oxide-contaminated calcium carbide to produce a gaseous mixture of elemental calcium and carbon monoxide; passing said gaseous mixture to a purifying zone maintained at a temperature above the condensation temperature of elemental calcium, said purifying zone containing titanium metal therein, reacting said carbon monoxide with said titanium metal in said purifying zone to form at least one solid compound at the temperature of said purifying zone; and passing said gaseous calcium to a cooling zone maintained at a temperature below the condensation temperature of said calcium to recover said elemental calcium.

4. A process for the production of calcium metal which comprises thermally decomposing, under sub-atmospheric pressure conditions, calcium oxide-contaminated calcium carbide to produce a gaseous mixture of elemental calcium and carbon monoxide; passing said gaseous mixture to a purifying zone maintained at a temperature above the condensation temperature of elemental calcium, said purifying zone containing titanium metal therein, reacting said carbon monoxide with said titanium metal in said purifying zone to form at least one solid compound at the temperature of said purifying zone; and passing said gaseous calcium to a cooling zone maintained at a temperature below the condensation temperature of said calcium to recover said elemental calcium.

5. The process in accordance with claim 4 wherein said purifying zone is maintained at a temperature in the order of 1000° C.

References Cited in the file of this patent

UNITED STATES PATENTS

| | | |
|---|---|---|
| 2,456,935 | Fisher | Dec. 21, 1948 |
| 2,681,847 | Wainer | June 22, 1954 |